United States Patent
Akins et al.

(10) Patent No.: US 6,285,425 B1
(45) Date of Patent: Sep. 4, 2001

(54) RIDGED REFLECTOR FOR AN OPTICAL DISPLAY HAVING A CURVED AND A PLANAR FACET FOR EACH RIDGE

(75) Inventors: Robert Benjamin Akins, Palatine; Kevin William Jelley, LaGrange Park; George Thomas Valliath, Buffalo Grove, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/106,477

(22) Filed: Jun. 29, 1998

(51) Int. Cl.[7] ................................................. G02F 1/1335
(52) U.S. Cl. ............................................................. 349/113
(58) Field of Search ...................... 349/113, 65; 362/296, 362/297, 341, 346, 347, 348

(56) References Cited

U.S. PATENT DOCUMENTS

| | | |
|---|---|---|
| 3,752,974 | 8/1973 | Baker et al. . |
| 4,011,001 | 3/1977 | Moriya . |
| 4,017,155 | 4/1977 | Yagi et al. . |
| 4,040,727 * | 8/1977 | Ketchpel ............................. 349/113 |
| 4,106,859 * | 8/1978 | Doriguzzi et al. ................... 349/113 |
| 4,252,416 | 2/1981 | Jaccard . |
| 4,282,560 | 8/1981 | Kringel et al. . |
| 4,573,766 | 3/1986 | Bourney, Jr. et al. . |
| 4,737,896 | 4/1988 | Mochizuki et al. . |
| 4,798,448 | 1/1989 | van Raalte . |
| 4,799,137 | 1/1989 | Aho . |
| 4,822,145 | 4/1989 | Staelin . |
| 4,874,228 | 10/1989 | Aho et al. . |
| 4,896,953 | 1/1990 | Cobb, Jr. . |
| 4,929,062 | 5/1990 | Guzik et al. . |
| 4,975,808 | 12/1990 | Bond et al. . |
| 4,989,125 | 1/1991 | Cobb, Jr. et al. . |
| 5,005,108 | 4/1991 | Pristash et al. . |
| 5,029,060 | 7/1991 | Aho et al. . |
| 5,040,878 | 8/1991 | Eichenlaub . |
| 5,040,883 | 8/1991 | Cobb, Jr. . |
| 5,070,431 | 12/1991 | Kitazawa et al. . |
| 5,136,479 | 8/1992 | Ruffner . |
| 5,190,370 | 3/1993 | Miller et al. . |
| 5,245,454 * | 9/1993 | Blonder ............................... 349/113 |
| 5,477,239 | 12/1995 | Busch et al. . |
| 5,550,658 * | 8/1996 | Yoshihiro ............................ 349/113 |
| 5,594,830 * | 1/1997 | Winston et al. ..................... 349/146 |
| 5,608,550 | 3/1997 | Epstein et al. . |
| 5,805,252 * | 9/1998 | Shimada et al. .................... 349/113 |
| 5,818,554 * | 10/1998 | Hiyama et al. ..................... 349/106 |
| 6,072,551 * | 6/2000 | Jannson et al. ....................... 349/65 |

OTHER PUBLICATIONS

Hiyama, et al., "P–45: High–Performance Reflective STN–LCD with a Blazed Reflector", *SID 97 Digest*, pp. 655–658.

\* cited by examiner

*Primary Examiner*—Walter J. Malinowski
(74) *Attorney, Agent, or Firm*—Douglas D. Fekete

(57) ABSTRACT

A ridged reflector (10) for use in an optical display (12) comprises a polymeric layer (70) having a ridged surface (32) and an opposite surface (34) opposite the ridged surface (32). The ridged surface (32) includes a series of ridges (36). Each of said ridges (36) has a first face (42) and a second face (44) intersecting the first face (42). The first face (42) is oriented at a first angle (56) relative to a plane parallel to the opposite surface (34). A reflective metallic layer (68) overlies at least the first faces (42) of the polymeric layer (70). The first angle (56) is adapted to reflect and biasedly focus light obliquely intercepting the first face (56) into a radiation pattern about a normal axis (38) extending orthogonally from the opposite surface (34). The first face (42) may be curved to tailor a shape of the radiation pattern.

21 Claims, 6 Drawing Sheets

RIDGED REFLECTOR FOR AN OPTICAL DISPLAY HAVING A CURVED AND A PLANAR FACET FOR EACH RIDGE

BACKGROUND ART

The present invention relates generally to a ridged reflector for use in optical displays and an optical display device incorporating the reflector. More particularly, the present invention relates to a ridged reflector that is capable of yielding preferential viewing cones with selectable shapes for enhanced viewing of back-lighted and reflective liquid crystal displays.

Reflectors are often used in optical displays, such as liquid crystal displays, to permit viewing of the displays in ambient light alone. Prior art reflectors include planar specular reflectors and planar diffusive reflectors. Specular reflectors include a substantially planar surface that is covered with a reflective metallic coating. Specular reflectors are characterized by an angle of incidence being substantially equal to an angle of reflection. Diffusive reflectors typically have a roughened surface which is predominately coated with a metallic reflective coating. Diffusive reflectors are characterized by reflecting and scattering incident light. However, neither prior art specular reflectors, nor diffuse reflectors adequately compensate for the effects of glare in optical displays.

Glare represents an unwanted reflection of incident light off any refractive interface associated with a display device. In practice, the refractive interfaces are generally planar with smooth surfaces that are substantially parallel to one another so that the glare from multiple refractive interfaces may be additive. In general, as the difference between refractive indexes increases at the refractive interface, the amount of reflection also increases from the impedance mismatch at the refractive interface. Glare is characterized in that an incident angle approximately equals the magnitude of a reflection angle. Glare typically occurs at both glancing incident angles and nonglancing incident angles relative to any refractive interface above the liquid crystal material of the display device. Perceived glare is glare which is coincident with or lies within a preferential viewing cone of an optical display. Perceived glare may be perceived by a viewer and may detract from the usable brightness and the legibility of the display. Actual glare may exist regardless of whether or not, it is actually perceived by a viewer.

Glare may be categorized as primary glare and secondary glare. Primary glare occurs as ambient light is reflected from an exterior face of an optical display. Primary glare is typically more prevalent and bothersome to a viewer than secondary glare. Secondary glare occurs as ambient light is reflected from other refractive interfaces within the display without first reaching the reflector. For example, in a twisted nematic display secondary glare occurs when light entering the display is reflected from indium-tin oxide electrodes.

Commercially available glare-reducing films have been used in optical displays to match different impedances at the refractive interfaces so as to reduce glare reflections. The glare-reducing film generally has a thicknesses which is an integer multiple of a quarter wavelength within the visible light frequency range. However, glare-reducing films tend to increase manufacturing costs in a manner which discourages their wide-spread commercial use.

Specular and diffusive reflectors may be further characterized as single mode or dual mode reflectors. Single-mode reflectors merely reflect light. Dual-mode reflectors have both a reflective mode and a transmissive mode. Dual-mode reflectors are sometimes referred to as transflectors. The reflective operational mode is desired when using the device in ambient light. The transmissive mode is desired when using the device in the dark or when inadequate ambient light is present.

A display device has a preferential viewing cone, which defines the relationship between a viewer and a display device, where the viewer has the best vantage of the display based upon observational factors, such as glare, legibility, contrast, and display brightness. The display device typically has a symmetrical viewing cone with a generally circular cross section about an axis normally extending from the display device. The display device has a physical viewing interface, such as a lens or screen.

The preferential viewing cone may not coincide with viewing proclivities of viewers in various circumstances. The viewing proclivities are influenced by human factors which may differ from device to device, incorporating optical displays. For example, cellular phone users may prefer displays which may be brightly viewed by both the driver and the passenger of an automobile. Yet, most commercially available cellular phones do not offer a preferential viewing cone of sufficient horizontal breadth for simultaneously bright viewing by both the driver and the passenger. In another example, seated users of personal digital assistants (PDA's) may prefer displays which may be brightly viewed regardless of the height of the user relative to display, which will further vary with attendant circumstances such as chair heights, table heights, ambient light directivity, and the like. Many commercially available personal digital assistants do not offer sufficient vertical breadth to accommodate seated users of various heights with equally bright displays. As a result, seated users may find PDA's awkward and uncomfortable to use.

Thus, a need exists for a display device which has a viewing cone with a selectable shape corresponding to the viewing proclivities of users, as impacted by human factors and the intended use of an electronic device incorporating the display device. In addition, a need exists for a reflector which reduces perceived glare in display devices.

SUMMARY OF THE PRESENT INVENTION

The present invention relates to a ridged reflector permitting operation of an optical display device in ambient light. A ridged reflector for use in an optical display includes a polymeric layer having a ridged surface. The ridged surface includes a series of ridges. Each of the ridges has a first face and a second face intersecting the first face. A reflective layer predominately or entirely overlies at least the first face of the ridged surface. The ridged reflector has an opposite surface opposite the ridged surface. The first face is preferably oriented at a first angle relative to a plane lying parallel to the opposite surface. The first angle is selected to reflect and biasedly focus light obliquely intercepting the first face into a radiation pattern about a normal axis extending orthogonally from the opposite surface.

The ridged reflector may be incorporated into an optical display device. For example, the optical display device may include an optical cell having a cell front with at least one cell region being capable of an optically transmissive mode and an optically nontransmissive mode with reference to the cell front. The optical cell contains an optically active material responsive to an applied electrical field or thermal input such that optical properties of the material are controllably changeable. The ridged reflector is optically coupled to the optical cell. The ridged reflector and the cell optically cooperate such that light entering the display within a nonglancing incident angle range is emitted from the display within an exiting angle range distinct in magnitude from the incident angle range and within a preferential viewing cone. The incident angle range and the exiting angle range may be described with reference to their peak intensities, which may be defined by a peak incident angle and a peak exiting angle. Accordingly, the peak incident angle and the peak exiting angle have different magnitudes so that the peak exiting angle differs from a glare angle associated with glare. The incident angle range and the exiting angle range are measured relative to a normal axis orthogonally extending from a viewing plane substantially parallel to the cell front. Thus, the ridged reflector may reduce the perceived glare of a viewer.

The ridged reflector features preferential viewing cones with selectable radiation pattern shapes, which may be tailored to the viewing proclivities of viewers, in accordance with human factors and device-specific design goals. The selectable shapes include conical preferential viewing cones with generally circular cross sections and conical preferential viewing cones with generally oval (i.e. elliptical) cross sections, about a normal axis extending from the viewing plane. The variations in the preferential viewing cones may be obtained through concavely or convexly curving the first faces to focus or shape the preferential viewing cone. Furthermore, the first faces may be parabolically concave or parabolically convex to biasedly focus the shape of the preferential viewing cone. The skewed or asymmetrical preferential viewing cones permit vertical compression of the viewing cones and/or horizontal expansion of the viewing cone to correspond with device-specific design requirements of electronic devices incorporating optical display devices. The reflector allows efficient reflectivity for viewing the display under ambient light conditions. The reflector may offer an optional optical communication path for an optional back-light for viewing the display under dark or night conditions.

DETAILED DESCRIPTION OF THE PREFERRED EMBODIMENTS

Figure 1:
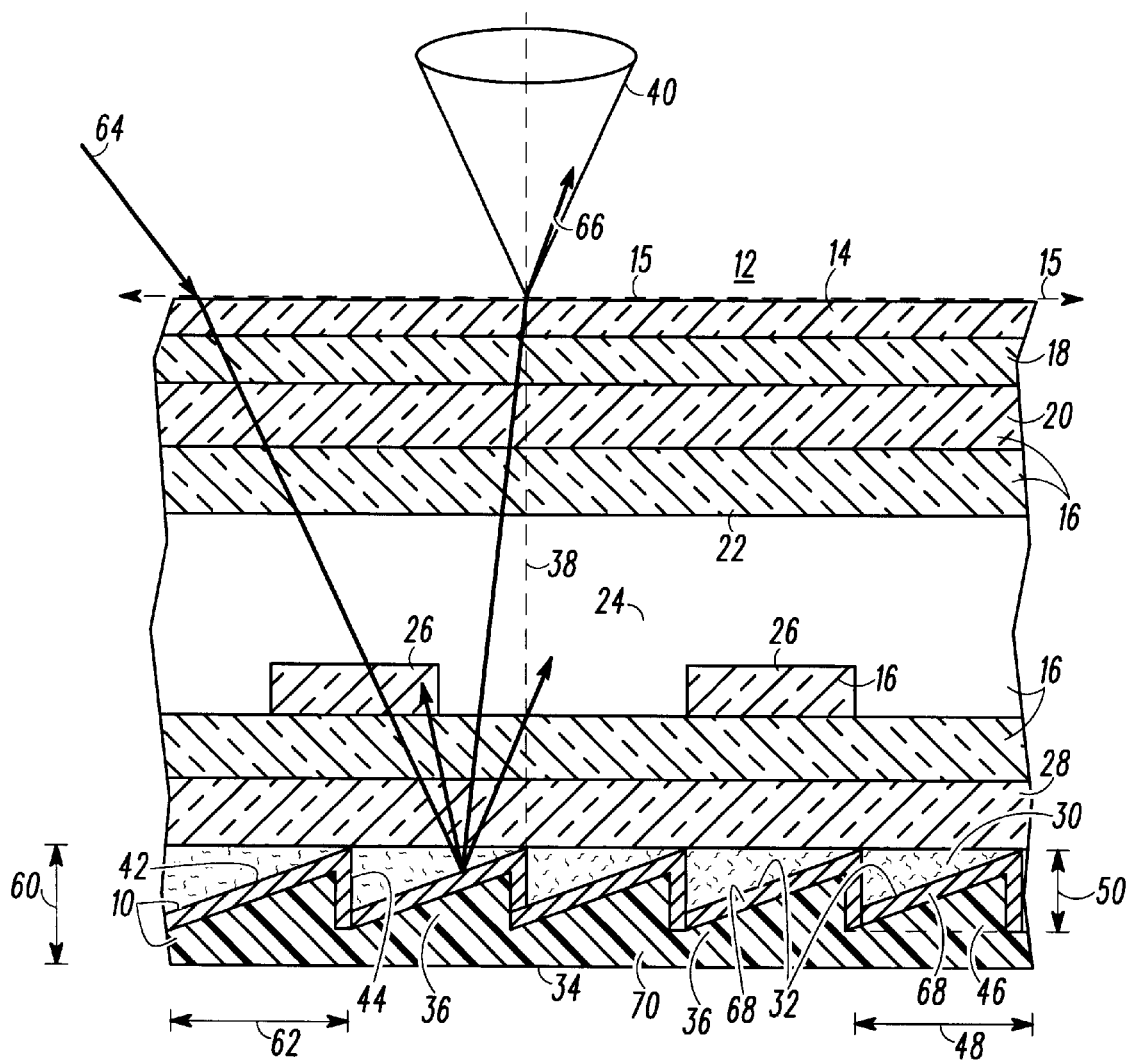
FIG. 1 is a cross-sectional view of a first embodiment of an optical display incorporating a first embodiment of a ridged reflector of the invention for operation in a single-mode.

FIG. 1 shows a ridged reflector 10 incorporated into an optical display device 12, which may operate in a reflective mode through ambient light. While FIG. 1 illustrates a twisted nematic liquid crystal display, the ridged reflector may be incorporated into other types of optical displays, such as liquid crystal displays, guest-host effect liquid crystal displays, polymer-dispersed liquid crystal displays, chiral nematic displays, or the like. Illustrative examples of various displays which may use the ridged reflector are described in "Liquid Crystals, Applications and Uses", Bahadur, B., *World Scientic*, 1991, Vol. 1, Ch. 6–11 and Vol. 3, Ch. 19, which is incorporated herein by reference.

The optical display device 12 preferably comprises a viewing interface 14 and a reflector 10 optically coupled to an optical cell 16. The viewing interface 14 may be a lens or a screen which is adapted to receive ambient light. A viewing plane 15 is a mathematical plane which is generally coextensive with an exterior surface of the physical viewing interface 14.

The optical cell 16 may be, for example, a twisted nematic cell as illustrated in FIG. 1. In general, the optical cell 16 may be any commercially available optical cell or optical panel. The optical cell 16 for a twisted nematic display preferably includes a transparent front plate 20, a front electrode 22, an optically active material 24, one or more rear electrodes 26, a transparent rear plate, a front polarizer 18, and a rear polarizer 28. The front plate 20, the rear plate, and end caps (not shown) confine the optically active material 24. The front plate 20 and the rear plate may be separated by spacers (not shown).

The front electrode 22 is attached to the front plate 20, while one or more rear electrodes 26 are attached to the rear plate. The front electrode 22 and one or more rear electrodes 26 may be made of a thin coating of indium oxide, tin oxide, or indium-tin oxide. The front electrode 22 and the rear electrode 26 are energized with direct current voltage or alternating current voltage to selectively apply an electric field to one or more regions of the optically active material 24.

The optically active material 24 is a liquid crystal material, an optically anisotropic material, or the like. The optically active material 24 has controllably changeable optical properties in response to the applied electric field, although in other embodiments the optically active material may respond to thermal input. The optically active material 24 and the applied electric field permit an optically transmissive mode and a nontransmissive mode. The optically transmissive mode allows sufficient transmission of light through the optical cell 16 to permit a viewer to distinguish the transmissive mode from the nontransmissive mode. The optically transmissive mode permits the transmission of light through a particular cell region between the cell front and the cell back such that the light transmitted through the cell is perceptible to a viewer. The attenuation of the cell in the transmissive mode is optimally minimized to keep an adequate intensity differential between the transmissive mode and the nontransmissive mode, yielding a sufficiently contrasted, viewable image for a viewer. The optically nontransmissive mode attenuates light by an amount sufficient to significantly reduce the intensity of the light traversing the entire cell region The reduction of the intensity of the nontransmissive mode is optimally maximized to keep an adequate intensity differential between the transmissive mode and the nontransmissive mode.

The front polarizer 18 and the rear polarizer 28 preferably define a cell front and a cell rear, respectively for a twisted nematic cell. In alternate embodiments, where the front polarizer, the rear polarizer, or both are not present, the front plate and the rear plate may define the cell front and the cell rear, respectively. In FIG. 1 for normally dark characters on a bright display, the front polarizer 18 and the rear polarizer 28 have a polarization offset so that optically active material 24 must rotate the polarization of the light in the transmissive mode. Those of ordinary skill in the art appreciate that optical displays other than twisted nematic displays may rely on other optical properties, other than polarization to produce a transmissive mode and a nontransmissive mode. For example, guest-host effect cells with dichroic dye may be implemented with no polarizers. Guest-host cells may use an ordered state in which dye molecules are oriented parallel to a director of a chiral nematic liquid crystal material to facilitate a display.

The ridged reflector 10 is oriented for optical communication with the optical cell 16. The ridged reflector 10 is preferably affixed to the cell rear via a transparent adhesive 30. The transparent adhesive 30 may be diffusive. The diffusive characteristics of the adhesive 30 are illustrated in FIG. 1 by the three illustrative light rays above the ridged reflector 10 at slightly different angles. The ridged reflector 10 has a ridged surface 32 of wavelike bumps and an opposite surface 34 opposite the ridged surface 32.

Although a first embodiment of the ridged reflector 10 is shown in FIG. 1, any of the various embodiments of the ridged reflector 10 illustrated in FIG. 3 through FIG. 9 may be incorporated into the optical display. In alternate embodiments, the ridged reflector is oriented for optical communication with the optical cell 16 such that an air-space or a gas-filled gap intervenes between the ridged reflector and the optical cell 16, instead of the transparent adhesive.

Figure 2:
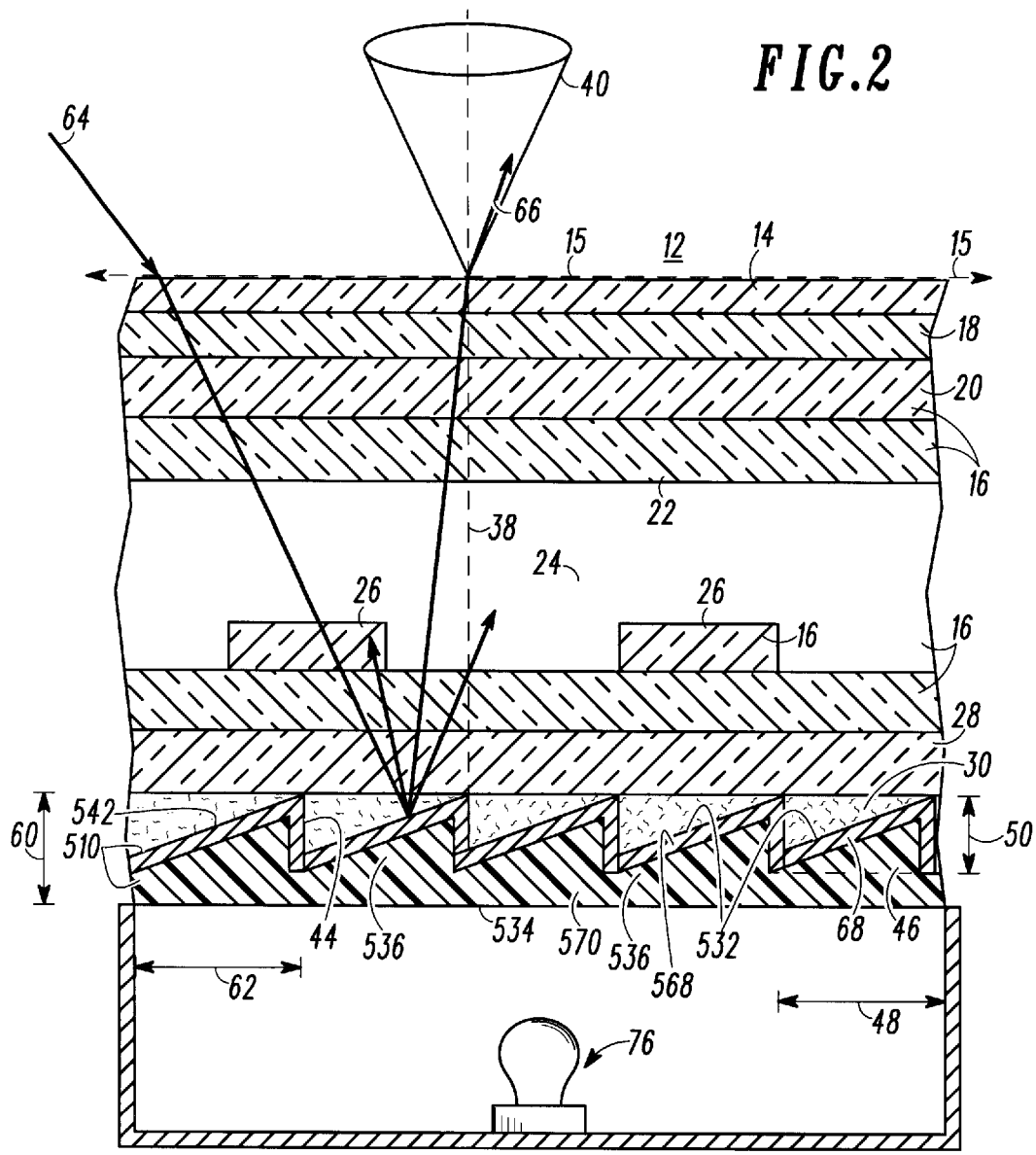
FIG. 2 is a cross-sectional view of a second embodiment of the optical display incorporating a second embodiment of a ridged reflector for operation in a dual-mode.

FIG. 2 shows an optical display which is comparable to the optical display of FIG. 1, except: (1) the optical display of FIG. 2 features a light source 76; (2) the ridged reflector 510 of FIG. 2 has a sufficiently thin or discontinuous metallic layer 568 to permit back-lighting from the light source 76; and (3) the polymeric layer 570 of FIG. 2 is transparent or translucent.

The light source 76 is a lamp or a light source preferably located on the opposite side facing an opposite surface 534 such that the light source 76 optically communicates with the optical cell 16 through the transparent adhesive 30. The reflective metallic layer 568 is sufficiently thin such that the reflective metallic layer 568 is discontinuous to permit partial transmission light between the ridged surface 532 and the opposite surface 534. The reflective metallic layer 568 has a thickness selected to transmit at least ten percent of humanly visible white light, incident upon the metallic layer 568 from a light source 76 or backlight of suitable intensity. The intensity of the light source 76 is limited by power consumption, among other factors. In practice, if the reflective metallic layer 568 is thinner than or equal to approximately 800 angstrom units, the reflective metallic layer 568 will become discontinuous and; hence, light transmissive.

The ridged reflector 510 includes a ridged surface 532 having a plurality of ridges 536. The ridged surface 532 has first faces 542 oriented to reflect light obliquely intercepting the first faces into a preferential viewing cone about a normal axis that is normal to the generally planar opposite surface 534 or the viewing plane 15. The second faces 544 preferably intersect with the first faces 542. The first faces 542 are preferably generally parallel to each other such that the first faces 542 generally face toward first directions, while the second faces 544 generally face toward second directions distinct from the first directions. The first faces 542 have first normals generally directed toward the first directions, while the second faces 544 have second normals generally directed toward the second directions. The corresponding first normals of adjacent ones of the first faces 542 are preferably substantially parallel to one another.

In an alternate embodiment, diffusers, diffusive film, or diffusive adhesives may be added to the optical displays described herein to improve display performance. For example, a front asymmetric diffuser could be optically coupled to the front polarizer. An asymmetric diffuser is commercially available from Sumitomo Chemical Ltd., Co. of Japan under the trade designation of Lumisty. A standard sheet diffuser film is commercially available from Minnesota, Mining, and Manufacturing (3M) Corporation of Minnesota under the trade designation of Light Diffusing Film or DFA.

Figure 3:
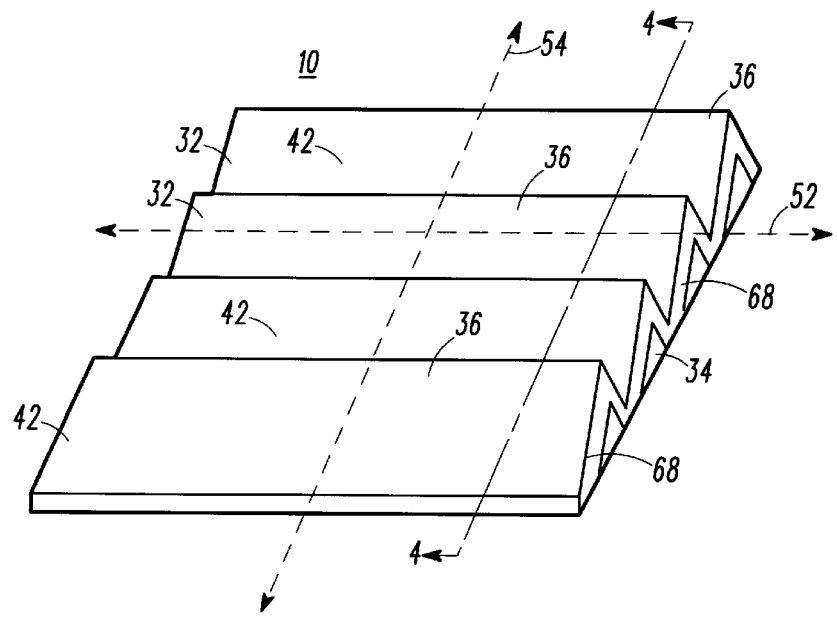
FIG. 3 is a perspective view of a first embodiment of the ridged reflector for use in the optical display.
Figure 4:
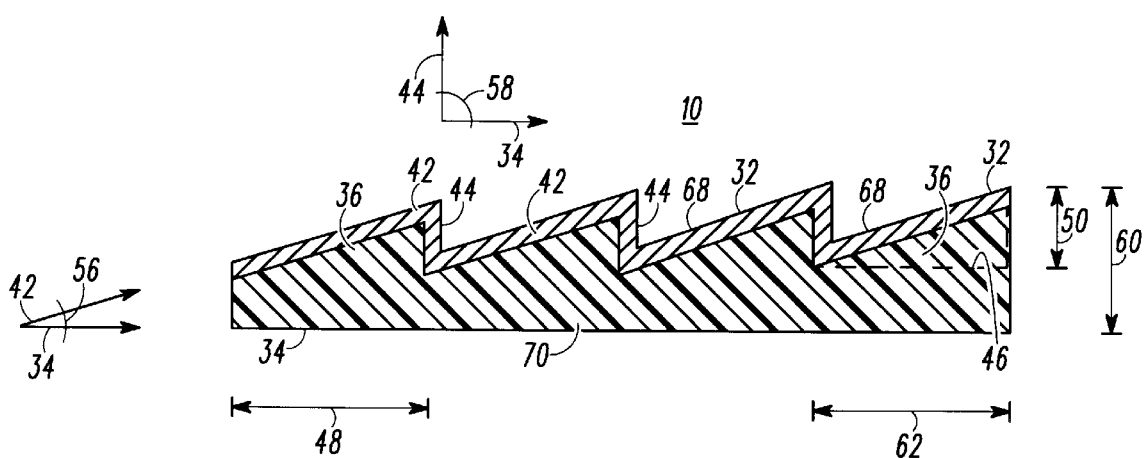
FIG. 4 is a cross-sectional view of the ridged reflector as viewed along reference line 4—4 of FIG. 3.

FIG. 3 and FIG. 4 show a first embodiment of the ridged reflector 10, which was previously shown in the optical display of FIG. 1. The ridged reflector 10 has a ridged surface 32 and an opposite surface 34 opposite the ridged surface 32. The opposite surface 34 is preferably substantially planar and smooth. The ridged surface 32 comprises a series of ridges 36. Each of the ridges 36 has a first face 42 and a second face 44, which preferably intersect with the first face 42. The ridged surface 32 is preferably optically coupled to the cell back of an optical cell 16, while a viewer views the optical cell 16 from the cell front of the optical cell 16.

The first faces 42 are preferably substantially parallel to each other. The first faces 42 generally face toward first directions, while the second faces 44 generally face toward second directions distinct from the first directions. The first faces 42 have first normals generally directed toward the first directions, while the second faces 44 have second normals generally directed toward the second directions. The first normals may coincide with focal points of the first faces 42. The first normals of adjacent ones of the first faces 42 are preferably substantially parallel to one another.

The first faces 42 are preferably oriented to reflect light obliquely intercepting the first faces 42 into a preferential viewing cone 40 about a normal axis 38 that is normal to the opposite surface 34 or the viewing plane 15. The second faces 44 may be oriented to minimize any potentially destructive reflective interference with reflections from the first faces 42 that may detract from the intensity of the preferential viewing cone 40. Accordingly, the second face 44 may be oriented to produce glancing interactions with an illumination angle associated with incident light 64 upon the viewing interface 14, after considering the refractive interfaces intermediately disposed between the ridged reflector 10 and the viewing interface 14.

As shown, each ridge 36 has a generally triangular cross section 46 characterized by a base 48 and a height 50. Each ridge 36 has a longitudinal axis 52 that is oriented perpendicularly to the triangular cross section 46 and its cross-sectional axis 54. The first face 42 has a first slope defining a first angle 56 with respect to a plane substantially parallel to the opposite surface 34 or a viewing plane 15. The first angle 56 is selected to reflect and biasedly focus light obliquely intercepting the first face 42 into a radiation pattern about a normal axis 38 extending perpendicularly from the opposite surface 34. The biasedly focusing of light refers to the predisposition or tendency of reflected light to be redirected into a preferential viewing cone 40. The biasedly focused light may have diagonal propagational directions relative to the normal axis 38. However, the biasedly focused light may have propagational directions that are parallel to or coincident with the normal axis 38.

The first angle 56 may range from 10 degrees to 60 degrees. The first angle 56 optimally has a range from approximately 15 to 25 degrees to reflect light interacting with the first face 42 into the preferential viewing cone 40 about an axis 38 perpendicular to the viewing plane 15.

The first angle 56 may be established to correspond to an illumination angle. The illumination angle falls within an angular illumination range of peak intensities that incident light 64 makes with respect to a viewing plane 15. The illumination range has a geometric center and an amplitude profile. The peak amplitude may coincide with a geometric center, but need not coincide with a geometric center. As used herein, centered shall refer to a light ray coextensive with the geometric center of the illumination range, the preferential viewing cone 40, the glare range, the exiting angle range, or the like. The illumination angle takes into account a viewer's proclivity or tendency to orient the optical display for optimal viewing. The illumination angle typically ranges from twenty-five to forty degrees, with respect to a normal axis 38 extending perpendicularly from the viewing plane 15, based upon displays used with overhead indoor lighting or outdoors.

The relationship between the illumination angle and the first angle 56 is best described with reference to the following illustrative examples. In a first example, if the illumination range is centered at thirty degrees, if the preferential viewing cone is centered at zero degrees, and if the ridged reflector is bounded by an adhesive interface with and index of refraction approximately equal to 1.5, then the first angle is optimally ten degrees. In another example, if the illumination range is centered at thirty degrees, if the viewing cone is centered at zero degrees, and if the ridged reflector is bounded by an air interface, then the first angle is optimally fifteen degrees. In yet another example, if the illumination range is centered at forty degrees, if the viewing cone is centered at negative ten degrees and if ridged reflector is bounded by an air interface, the first angle is optimally twenty five degrees, The second face 44 has a second slope defining a second angle 58 with a plane substantially parallel to the opposite surface 34 or the viewing plane 15. Although the second angle 58 is illustrated as 90 degrees, the second angle 58 preferably may range from 45 degrees to 135 degrees. In alternate embodiments, the first angle and the second angle may have different magnitudes than previously described herein.

FIG. 3 and FIG. 4 illustrate a first embodiment of the ridged reflector that produces a generally conical viewing cone with a generally circular cross section in response to light incident upon the ridged reflector 10. The conical viewing cone achieves a conical shape because of the diffusive means for diffusing light within the display (i.e. transparent adhesive 30) and ambient light sources which tend to be somewhat directional. Certain directional light sources may be modeled as having conical propagational radiation patterns, further contributing to a conical shape of the preferential viewing cone. The first faces 42 in FIG. 3 through FIG. 4 have rectilinear or constant slopes which contribute toward forming a symmetrical cross-section of a preferential viewing cone 40 if the reflector 10 is incorporated into an optical display. In the first embodiment, the first slope and the second slope are preferably substantially uniform throughout the cross-section of each of said ridges 36.

The ridged reflector 10 has a maximum thickness 60 defined by the distance between a peak of a ridge 36 and the opposite surface 34. The ridges 36 have a peak-to-peak spacing between adjacent peaks which is called the pitch 62 of the ridged surface 32. Each pixel may have a tendency to be illuminated by a corresponding first face 42 based on the illumination angle and the preferential viewing cone 40. In a preferred embodiment, a linear dimension of each first face 42 is equal to or less than the corresponding linear breadth of a corresponding pixel of the display to maximize the brightness uniformity of adjacent and nearby same-state pixels. As a whole, if the linear dimensions of the first faces 42 individually exceed the corresponding linear breadth of the pixels, the display may appear as if the display is not uniformly illuminated, even if it is.

An illustrative example of the ridged reflector 10, which may be used to practice the present invention, has a triangular cross-section 46 defined by a typical base 48 dimension of 200 microns, a typical height 50 of 75 microns, a typical maximum thickness 60 of 150 microns, a first angle 56 of approximately 15 degrees, and a second angle 58 of approximately 90 degrees. The ridged reflector 10 preferably has a height 50 within a range from approximately 60 to 100 microns. The ridges 36 optimally adjoin one another in the illustrative example. The pitch 62 density and the pixel pitch may range from five to ten per millimeter. If magnified sufficiently, the ridges 36 preferably are arranged to give the ridged surface 32 a jagged profile which resembles the profile of lapped siding on a house. Other dimensions and angular measures different from the above illustrative dimensions and angles may be used to practice the invention. For instance, the ridged reflector is not limited to any particular height, base, or maximum thickness, although preferential and exemplary dimensions are specified herein.

The ridged reflector 10 has a reflective metallic layer 68 that predominately or entirely overlies a polymeric layer 70. The polymeric layer 70 forms a base for the reflective metallic layer 68. At least the first faces 42 are covered with a reflective metallic layer 68. The second faces 44 preferably are covered with a reflective metallic layer 68.

The polymeric layer 70 is preferably formed of a polymer which is suitable for plating or coating with a reflective metallic layer 68. The polymeric layer 70 may be opaque. In an alternate embodiment, the polymeric layer is preferably an optically transmissive layer that is substantially transmissive to white humanly visible light. The optically transmissive layer may be transparent or translucent. In yet another alternate embodiment, the polymeric layer is substantially transmissive to a humanly visible light of a selected color, shade, and/or tint. The transmissive layer may contain a dye selected from the group consisting of optically-active dyes, tints, and dichroic dyes to be transparent to visible light of a selected color, shade, and/or tint. Such a transmissive layer forms an optically frequency selective filter.

The polymeric layer 70 is preferably composed of a polymer selected from the group consisting of acrylate resin, polyester resin, polycarbonate, epoxy resin, a thermoplastic, or the like. Polyester resin is preferred for its superior adhesion to plate metal films in comparison to other plastics. The reflective metallic layer 68 may comprise a metal film or polymeric adhesive film containing metallic particles. The reflective metallic layer 68 may be applied by spraying, sputtering, depositing, plating, evaporating, or electrolessly plating the polymeric layer 70 with a reflective metal, such as silver, aluminum, nickel, chromium, copper, or alloys of the foregoing metals Evaporating metal and additive plating onto the polymeric layer 70 are preferential manufacturing techniques for manufacturing a ridged reflector of the present invention. Silver-metal alloys, nickel-metal alloys, and aluminum-metal alloys are illustrative examples of reflective alloys. However, alloys are generally more difficult to plate than pure metals because of potentially conflicting process control conditions.

In an alternate embodiment, as previously described, the reflective metallic layer is sufficiently thin such that the reflective metallic layer is discontinuous to permit partial transmission light between the ridged surface 32 and the opposite surface 34. In practice, if the reflective metallic layer is thinner than or equal to approximately 800 angstrom units, the reflective metallic layer will become discontinuous and; hence, light transmissive.

In yet another alternate embodiment, the reflective metallic layer has a sufficiently rough surface finish to scatter light. An adequate surface roughness of the reflective metallic layer may be obtained by sputtering the metallic layer onto the polymeric base or by roughening the polymeric base by abrasives or caustic solutions prior to applying the reflective metallic layer.

In still another alternate embodiment, different ones of the first faces are angularly offset or slightly tilted with respect to one another so the aggregate group of first faces has a common focal point. The first faces may be tilted toward a common focal point such that the tilts or the first cross-sectional slopes of the first faces vary along the cross-sectional axis and/or the longitudinal axis. The first faces appear to have different first cross-sectional slopes, even if the same first cross-sectional slope is merely tilted with respect to adjacent first faces. The angular tilt provides a uniform brightness of large displays, where the viewing angle changes over the viewing plane of the viewing interface, such as a lens, screen, or display face. Displays appear uniformly illuminated when the first faces are so angularly tilted.

The polymeric layer 70 is preferably etched to produce microporosity on the surface to improve adhesion between the polymeric layer 70 and the reflective metallic layer 68. When the reflective metallic layer 68 is deposited, the reflective metallic layer 68 fills the micro-pores, resulting in an interlocking bond. The appropriate etch solution required varies with the particular polymer comprising the polymeric layer 70. A solution of sulfuric acid, potassium dichromate, and water may be used as an etch solution for some polymers.

An alternate manufacturing technique involves treating the polymeric layer with a catalytic plating conditioner to facilitate the formation of the reflective metallic layer upon the polymeric layer. Metal oxide particles dispersed in the polymeric layer, or its precursor, may be used as the catalytic plating conditioner. The reflective metallic layer may comprise a metal film. The reflective metallic layer may be applied by depositing, sputtering, plating, or electrolessly plating the polymeric layer with a reflective metal, such as silver, aluminum, nickel, chromium, copper, and alloys of the foregoing metals.

Another alternate manufacturing technique involves stamping a ridged reflector from sheet metal stock or casting the reflector from aluminum, obviating the need for plating the polymeric layer, altogether.

Figure 5:
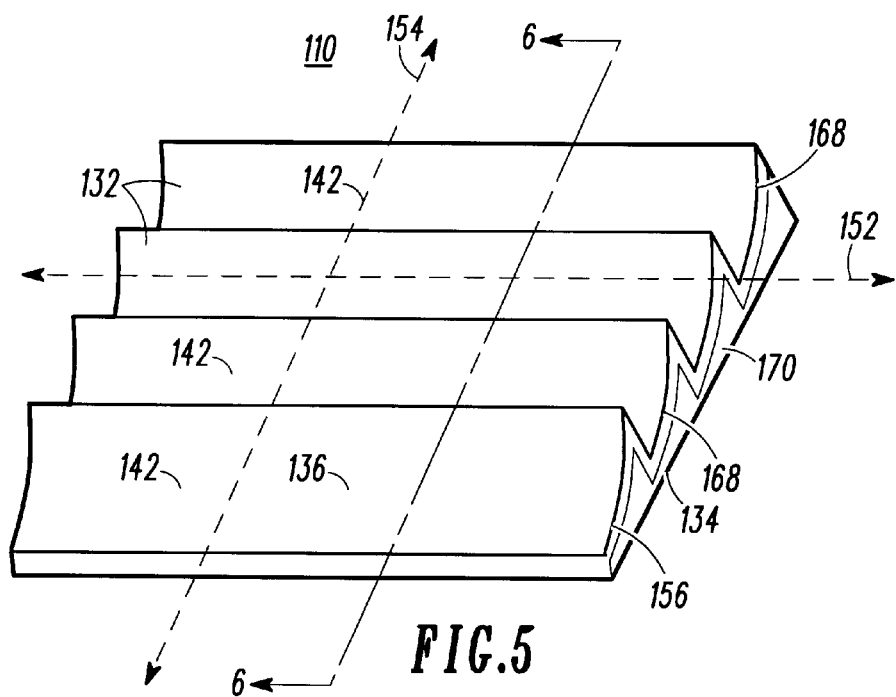
FIG. 5 is a perspective view of a third embodiment of a ridged reflector.
Figure 6:
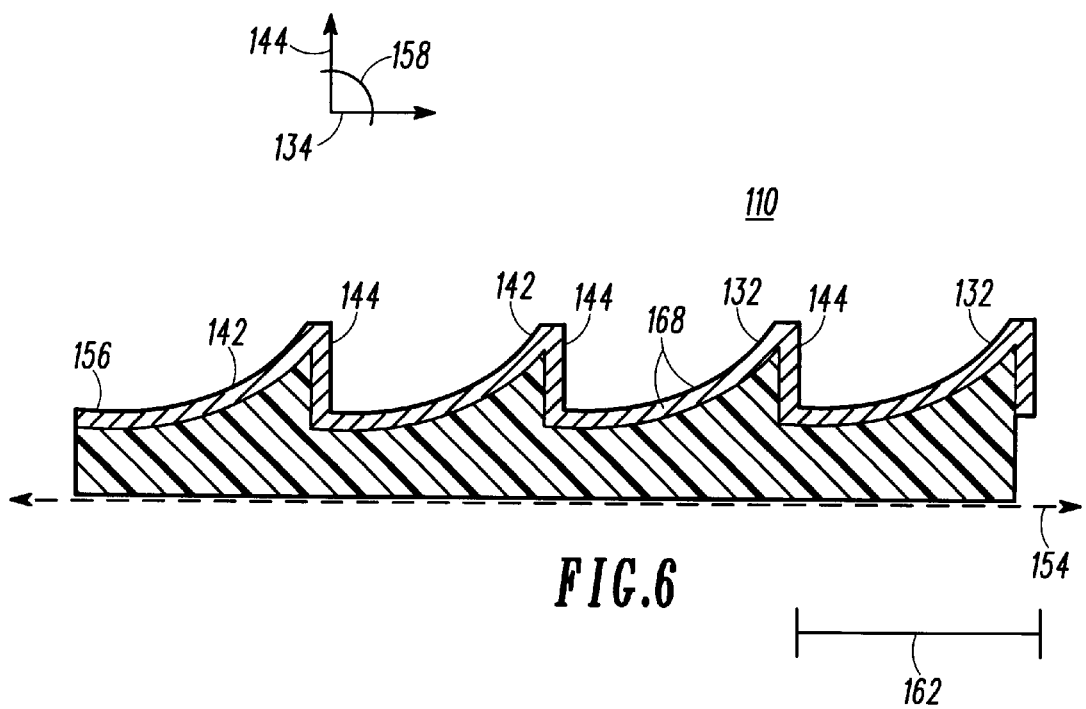
FIG. 6 is a cross-sectional view of the ridged reflector as viewed along reference line 6—6 of FIG. 5.

FIG. 5 through 9 illustrate embodiments of the ridged reflector that produce generally semi-conical viewing cones with generally oval (i.e. elliptical) cross sections parallel to the opposite surface and the viewing plane. FIG. 5 and 6 illustrate a third embodiment of the ridged reflector 110. The ridged reflector 10 includes a ridged surface 132 and an opposite surface 134 opposite from the ridged surface 132. The ridged reflector 110 has a longitudinal axis 152 which is substantially perpendicular to the cross-sectional axis 154. The ridges 136 are spaced apart along the cross-sectional axis 154 by a pitch 162.

The ridged reflector 10 has first faces 142 that are concavely curved with curvatures 156 to produce a semi-conical viewing cone with a generally oval (i.e. elliptical) cross section, parallel to the viewing plane 15. The first face 142 of each ridge 136 is concavely curved along the cross-sectional axis 154 of the ridges 136. If the first slope of the first face 142 is concavely curved, the preferential viewing cone may be vertically compressed, so long as the cross-sectional axis 154 of the ridges 136 is parallel with or coincident with the vertical axis of the viewing plane 15. The vertical axis is vertical relative to a viewer's perspective, if the display is oriented appropriately for viewing.

The ridged reflector 110 has a reflective metallic layer 168 that predominately or entirely overlies the polymeric layer 170. In particular, the first faces 142 are predominately or entirely covered a reflective metallic layer 168. The polymeric layer 170 may be opaque. The second face 144 preferably is covered with the reflective metallic layer 168 to simplify the manufacturing process. The second face 144 has an angle 158 measured with respect to the opposite surface 134. In an alternate embodiment, the second face is not covered with a reflective material, but may be covered with a light absorbing coating or the second face may expose a polymeric base material having light-absorbing properties.

Each of the first faces 142 has a curvature 156 which is a curved cross sectional slope of a ridge 136. The curvature 156 has an extent of concavity. The curvature 156 is selected to produce a displacement of the preferential viewing cone from glare similar to the first illustrative embodiment of the ridged reflector 10. Along the cross-sectional axis, the curvature 156 preferably may be approximated by a series of line segments in which at least one of the line segments tracks or does not substantially deviate from the first angle of the first embodiment of the ridged reflector 10. The curvature of the first face 142 is preferably uniform along the longitudinal axis 152.

The first faces 142 are preferably substantially parallel to each other. The first faces 142 generally face toward first directions, while the second faces 144 generally face toward second directions distinct from the first directions. The first faces 142 have first normals tangential to the curvature 156. The first normals are generally directed toward the first directions, while the second faces 144 have second normals generally directed toward the second directions. The first normals may coincide with or pass through focal points of the first faces 142. The corresponding first normals of adjacent ones of the first faces 142 are preferably substantially parallel to one another.

The oval cross section of the preferential viewing cone may be elongated along a major axis and diminished along a minor axis, which is generally oriented perpendicularly to the major axis. The selectable shapes of the preferential viewing cone may be skewed or asymmetrical in the sense that a cross section of the preferential viewing cone has a major axis that is preferably longer than a minor axis. The minor axis represents the minimal dimension of the cross section while the major axis represents the maximum dimension of the cross section of the preferential viewing cone.

While the preferential viewing cone is normally referenced about a normal axis perpendicular to the opposite surface or the viewing plane, the preferential viewing cone may be tilted with respect to the viewing plane. The elongation of the cross section and the tilt of the viewing cone may be accomplished independently or together in accordance with the scope of the present invention. The tilting of the viewing cone is accomplished by tilting the first faces toward a displaced common focal point, which is displaced from a reference focal point bisected by the normal axis perpendicular to the viewing plane.

The first faces 142 have a curvature 156 which is selected to produce a displacement of the preferential viewing cone from glare similar to the first illustrative embodiment of the ridged reflector 10. The maximum extent or degree of concavity is selected to provide an appropriately shaped preferential viewing cone, without unwanted skewing. The maximum degree of concavity may be estimated from a maximum dimensional difference between an imaginary flat, rectilinear first face (in accordance with the first embodiment of the ridged reflector 10) and a curvature 156 of the actual concavely curved first face 142 (in accordance with the third embodiment of the ridged reflector 110). If the maximum dimensional difference; and hence, the maximum degree of concavity exceeds a predetermined limit, the preferential viewing cone may be extremely expanded in one dimension or extremely compressed in another dimension so that a viewer has difficulty viewing the display. The difficulty in viewing an extremely compressed display is first finding the preferential viewing cone and secondly maintaining appropriate alignment with the display to remain within the preferential viewing cone.

In an alternate embodiment where the reflector is partially transmissive to back-lighting, the maximum degree of concavity is balanced between back-lighting objectives and the desired shape of the preferential viewing cone. In yet another alternate embodiment, the first face is concavely and parabolically curved such that a curvature 156 of the first face varies parabolically throughout each of the ridges 136. The parabolic curvature allows additional focusing and tailoring of the preferential viewing cone.

In still other embodiments involving either concave or parabolically concave first faces, different first faces are angularly offset or slightly tilted with respect to one another so the aggregate group of first faces has a common focal point. The first faces may be tilted toward a common focal point such that the tilts or the first cross-sectional slopes of the first faces vary along the cross-sectional axis and/or the longitudinal axis. The first faces appear to have different first cross-sectional slopes, even if the same first cross-sectional slope is merely tilted with respect to adjacent first faces.

The same manufacturing techniques and considerations that apply to the first embodiment apply to the third embodiment of the ridged reflector 110.

Figure 7:
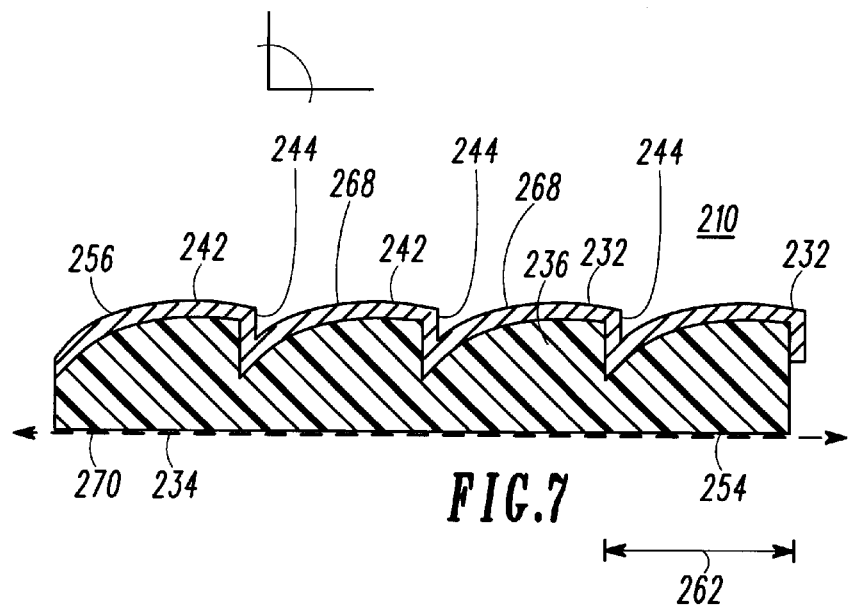
FIG. 7 is a cross-sectional view of a fourth embodiment of a ridged reflector.

FIG. 7 illustrates a fourth embodiment of the ridged reflector 210 that produces generally conical viewing cones with generally elliptical cross sections. The ridged reflector has a ridged surface 232 and an opposite surface 234 opposite the ridged surface 232. The ridged surface 232 comprises a series of ridges 236 spaced apart along a cross-sectional axis 254. The ridged reflector 210 preferably comprises a polymeric base layer 270 coated with a reflective metallic layer 268. The polymeric base layer 270 may be opaque.

The first faces 242 in FIG. 7 have curvatures 256 which contribute toward forming an asymmetrical preferential viewing cone once the reflector 210 is incorporated into an optical display. The curvatures 256 of the first faces 242 are convexly curved slopes along the cross-sectional axis 254 of the ridges 236. The curvature 256 is selected to produce a desired displacement of the preferential viewing cone from glare based upon an incident angle range and in accordance with the first illustrative embodiment of the ridged reflector 10. If the cross-sectional axis 254 is parallel to or coincident with the horizontal axis of the viewing plane 15, the preferential viewing cone of the third embodiment of the reflector 210 may be horizontally expanded. The curvature 256 preferably may be approximated by a series of line segments in which at least one of the line segments tracks or does not substantially deviate from the first angle of the first embodiment of the ridged reflector 10.

The ridged reflector 210 includes second faces 244 which preferably intersect with corresponding first faces 242. The second faces 244 make an angle 258 with respect to the opposite surface 234. The first faces 242 are preferably substantially parallel to each other. The first faces 242 generally face toward first directions, while the second faces 244 generally face toward second directions distinct from the first directions. The first faces 242 have first normals tangential to the curvature 256. The first normals are generally directed toward the first directions, while the second faces 244 have second normals generally directed toward the second directions. The first normals may coincide with focal points of the first faces 242. The corresponding first normals of adjacent ones of the first faces 242 are preferably substantially parallel to one another.

In an alternate embodiment, the first face is convexly and parabolically curved such that a cross-sectional slope of the first face varies parabolically throughout each of the ridges.

In yet another embodiment involving convexly curved or parabolically curved first faces, identically sloped first faces are angularly offset or tilted such that the first faces cooperate to form a common focal point within the preferential viewing cone. That is, the first faces may be tilted toward a common focal point such that the tilts or first cross-sectional slopes of the first faces vary along the cross-sectional axis and the longitudinal axis. The first faces appear to have different first cross-sectional slopes, even if the same first cross-sectional slope is merely tilted with respect to adjacent first faces.

Figure 8:
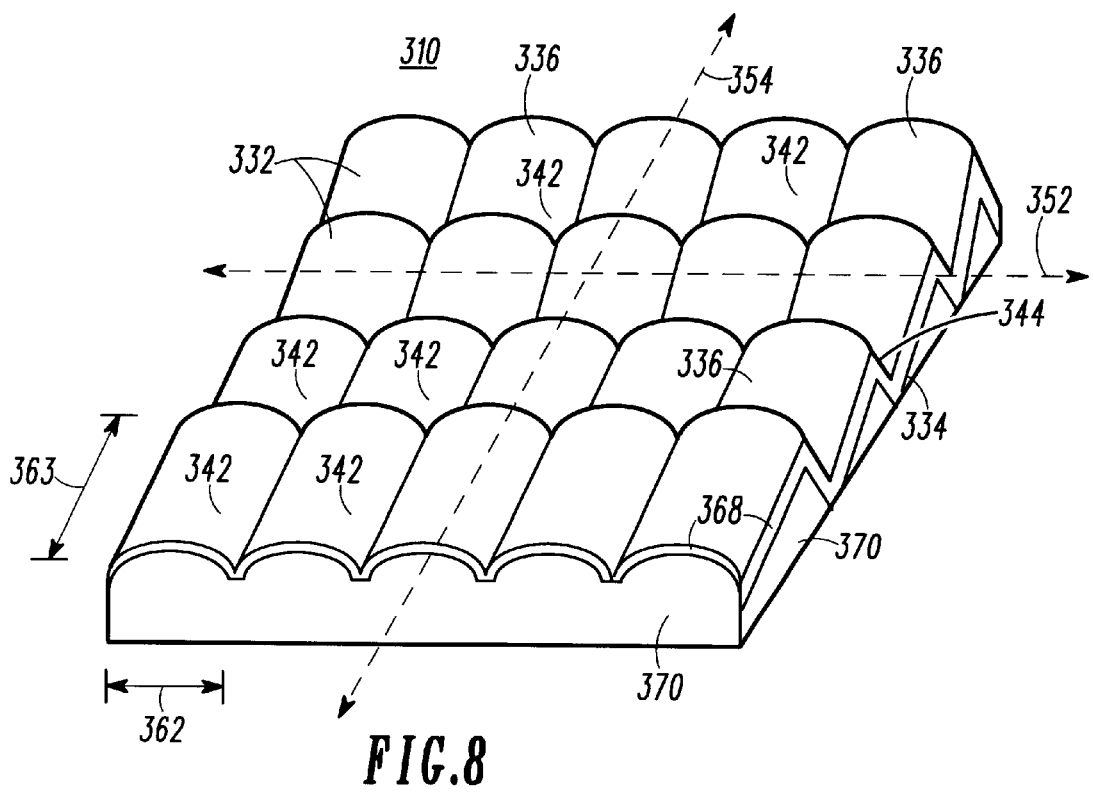
FIG. 8 is a perspective view of a fifth embodiment of a ridged reflector.

FIG. 8 illustrates a fifth embodiment of the ridged reflector 310 in which the first face 342 is convexly sloped along the longitudinal axis 352 of the ridges 336. In the fifth embodiment of the ridged reflector 310, the viewing cone may be horizontally expanded, so long as the longitudinal axis 352 of the ridged reflector 310 is parallel to or coincident with the horizontal axis of the viewing plane 15. The horizontal axis is horizontal relative to a viewer's perspective.

The ridged reflector 310 comprises a reflective metallic layer 368 overlying a polymeric base layer 370. The first faces 342 are predominately or entirely covered with a reflective metallic layer 368, as previously described in conjunction with other illustrative embodiments herein. The polymeric base layer 370 may be opaque. The first faces 342 of the fifth embodiment repeat along the longitudinal axis 352 as well as the cross-sectional axis 354, while in FIG. 3 the first faces 42 of the first embodiment of the ridged reflector 10 form one continuous face along the entire longitudinal axis 52. The locations of each first face 342 may be identified by a row number and a column number measured from a common reference point, such as a lower left corner of the ridged reflector 310. Second faces 344 preferably intersect with the first faces 342.

The first faces 342 have first normals tangential to the curvature of the first faces 342. The first faces 342 have first normals generally directed toward first directions, while the second faces 344 have second normals generally directed toward second directions, distinct from the first directions. The first normals may coincide with focal points of the first faces 342.

The ridged reflector 310 has a ridged surface 332 and an opposite surface 334, which is opposite from the ridged surface 332. The ridged surface 332 comprises a series of ridges 336. The ridges 336 have a cross-sectional pitch 363 along the cross-sectional axis 354. The cross-sectional pitch 363 is approximately equal to the distance between adjacent peaks of adjacent ridges 336. The ridges 336 have a longitudinal pitch 362 along the longitudinal axis 352. The longitudinal pitch 362 is approximately equal to the distance between adjacent valleys bordering each ridge 336.

Figure 9:
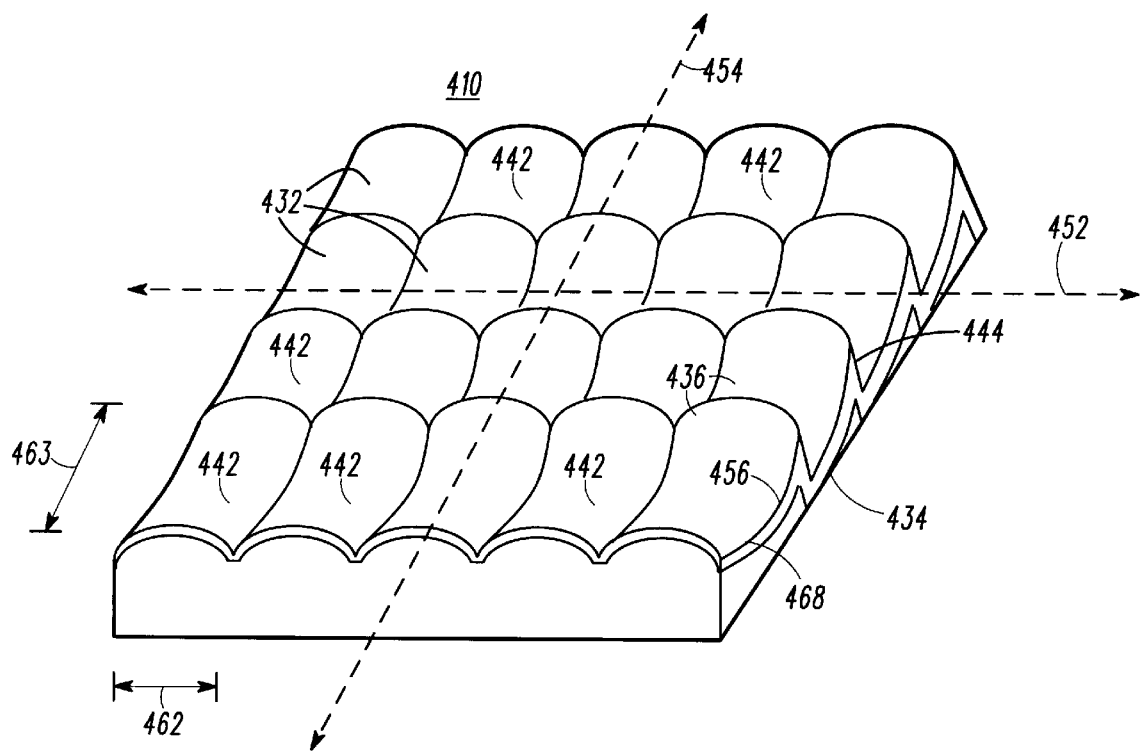
FIG. 9 is a perspective view of a sixth embodiment of a ridged reflector.

FIG. 9 illustrates a sixth embodiment of the ridged reflector 410 in which the first face 442 is both concavely and convexly sloped. Convexly sloping the first face 442 along the longitudinal axis 452 while concavely sloping the first face 442 along a cross-sectional axis 454, which is orthogonal to the longitudinal axis 452, yields a viewing cone which is simultaneously horizontally expanded and vertically compressed.

The combination of the concave and convex slope may be referred to as a complex curvature 456 of the first faces 442. The complex curvature 456 is selected to produce a desired displacement of the preferential viewing cone from glare based upon an incident angle range and in accordance with the first illustrative embodiment of the ridged reflector 10. The concave slope preferably may be approximated by a series of line segments in which at least one of the line segments tracks or does not substantially deviate from the first angle of the first embodiment of the ridged reflector 10.

The ridged reflector 410 preferably has a ridged surface 432 and an opposite surface 434, which is opposite from the ridged surface 432. The first faces 442 have first normals tangential to the curvature of the first faces 442. The first faces 442 have first normals generally directed toward first directions, while the second faces 444 have second normals generally directed toward second directions, distinct from the first directions. The first normals may coincide with focal points of the first faces 442.

The ridges 436 have a cross-sectional pitch 463 along the cross-sectional axis 454. The cross-sectional pitch 463 is approximately equal to the distance between adjacent peaks of adjacent ridges 436. The ridges 436 have a longitudinal pitch 462 along the longitudinal axis 452. The longitudinal pitch 462 is approximately equal to the distance between adjacent valleys bordering each ridge 436.

The ridged reflector 410 comprises a reflective metallic layer 468 overlying a polymeric base layer 470. The polymeric base layer 470 may be opaque. The reflective metallic layer 468 may be applied by plating, electroless deposition, or other suitable methods.

In sum, various embodiments of the first face may be convexly or concavely curved or sloped along the cross-sectional axis and/or the longitudinal axis of the ridges to manipulate the shape and scope of the preferential viewing cone as desired for improved visibility of the display. The convex and concave slopes may be parabolic. Any of the foregoing slope configurations may be tilted toward a common focal point for further manipulation of the preferential viewing cone. In general, the preferential viewing cone may be manipulated to change the circular cross section of the preferential viewing cone to a oval (i.e. elliptical cross section), which is usually parallel to the viewing plane 15. The oval cross section has a major and a minor axis, which are perpendicular to one another. The minor axis represents a diminished viewing breadth of the preferential viewing cone, while the major axis represents an enhanced viewing breadth of the preferential viewing cone.

The preferential viewing cone may be tailored into a radiation pattern that corresponds to a viewer's proclivities as determined by consumer preference studies of products incorporating displays with different preferential viewing cones. Human factor considerations may lead to device-specific designs with optimized preferential viewing cones based upon intended use of products incorporating displays. The preferential viewing cone preferably considers a seated viewers height relative to a viewing interface to maximize the probability the a viewer is best served by the breadth and tilt of the preferential viewing cone. Thus, the ridged reflector may improve legibility and brightness of the display based on a viewer's tendency to ergonomically use the preferential viewing cone.

Various illustrative embodiments of the ridged reflector and the display incorporating the ridged reflector have been described in this specification. Additional variations in the embodiments and processes described above may be apparent from this specification. Accordingly, the scope of the present invention is defined by reference to the following claims which are further exemplary of the present invention.

We claim:

1. An optical display device comprising:
   an optical cell having a cell front with at least one cell region being capable of an optically transmissive mode and an optically nontransmissive node with reference to the cell front;
   an optically active material contained in the optical cell, the optically active material responsive to an applied electrical field such that optical properties of the material are controllably changeable;
   a ridged reflector including a ridged surface facing the optical cell and an opposite surface opposite the ridged surface, the ridged surface comprising a reflective metallic layer and having a series of ridges, each of said ridges having a first curved face and a second flat face intersecting the first face; the first face oriented to reflect light obliquely intercepting the first face; the ridged reflector and the cell optically cooperating such that light entering a display within a nonglancing incident angle range is emitted from the display at an exiting angle range with a magnitude distinct from the incident angle range and within a preferential viewing cone, the incident angle range and the exiting angle range measured relative to a normal axis orthogonally extending from a viewing plane substantially parallel to the cell front.

2. The optical display according to claim 1 wherein the first face is concavely curved.

3. The optical display according to claim 1 wherein the ridged reflector has a cross-sectional axis; and wherein the first face is concavely curved along the cross-sectional axis, the cross-sectional axis being coincident with or parallel to a vertical viewing axis of the viewing plane such that the preferential viewing cone is generally oval and vertically compressed.

4. The optical display according to claim 1 wherein the first face is convexly curved.

5. The optical display according to claim 1 wherein the ridged reflector has a cross-sectional axis; and wherein the first face is convexly curved along the cross-sectional axis of the ridges, the cross-sectional axis being coincident with or parallel to a horizontal viewing axis of the viewing plane such that the preferential viewing cone is generally oval and horizontally expanded.

6. The optical display according to claim 1 wherein the first face is concavely curved along a cross-sectional axis of the ridges and convexly curved along a longitudinal axis of the ridges, the longitudinal axis being perpendicular to the cross-sectional axis, the longitudinal axis oriented coincident with or parallel to a horizontal viewing axis of the viewing plane such that the preferential viewing cone simultaneously is horizontally expanded and vertically compressed.

7. The optical display device according to claim 1 wherein ridges have first faces and second faces, adjacent ones of the first faces being tilted with respect to one another such that the first faces have a common focal point.

8. The optical display according to claim 7 wherein the curved first face approaches a substantially rectilinear slope and wherein the preferential viewing cone has a generally circular cross-section oriented substantially parallel to the viewing plane.

9. In an optical display device including a cell responsive to a change in an applied electrical field wherein the improvement comprises:

a ridged reflector including a polymeric layer and a reflective layer;

the polymeric layer having a ridged surface facing the cell and an opposite surface opposite the ridged surface, the ridged surface including a series of ridges;

each of said ridges having a curved first face and a second planar face intersecting the first face;

the reflective layer overlying at least the first face of each of said ridges.

10. The optical display device according to claim 9 wherein the first face is canted at a first angle relative to a plane parallel to the opposite surface and wherein the second face has a second angle relative to the plane, the second angle approximately being less than or equal to ninety degrees, the first face having a curvature capable of being approximated by a series of line segments generally tracking the first angle.

11. The optical display device according to claim 9 wherein the first face has a first angle relative to a plane parallel to the opposite surface and wherein the first angle has a range from approximately fifteen to twenty-five degrees, the first face having a curvature approximated by a series of end-to-end line segments generally tracking the first angle.

12. The optical display device according to claim 9 wherein the reflective layer and the polymeric layer are optically transmissive to white humanly visible light.

13. The optical display device according to claim 9 wherein the reflective layer and the polymeric layer are substantially transmissive to a humanly visible light of a selected color; and wherein the polymeric layer contains a dye selected from the group consisting of optically-active dyes and dichroic dyes.

14. The optical display device according to claim 9 wherein the polymeric layer is composed of a polymer selected from the group consisting of acrylate resin, silicone, polyester resin, polycarbonate, and epoxy resin.

15. The optical display device according to claim 9 wherein the reflective layer is formed of a metallic material selected from the group consisting of silver, nickel, aluminum, a silver-metal alloy, a nickel-metal alloy, and an aluminum-metal alloy.

16. The optical display device according to claim 9 wherein the first face is concavely curved such that a cross-sectional slope of the first face is substantially uniform throughout each of said ridges.

17. The optical display device according to claim 9 wherein the first face is convexly curved such that a cross-sectional slope of the first face is substantially uniform throughout each of said ridges.

18. The optical display device according to claim 9 wherein the first face is concavely and parabolically curved such that a cross-sectional slope of the first face varies parabolically throughout each of said ridges.

19. The optical display device according to claim 9 wherein the first face is convexly and parabolically curved such that a cross-sectional slope of the first face varies parabolically throughout each of said ridges.

20. The optical display according to claim 9 wherein the first face is concavely curved along a cross-sectional axis of the ridges and convexly curved along a longitudinal axis of the ridges, the longitudinal axis being perpendicular to the cross-sectional axis, the longitudinal axis oriented coincident with or parallel to a horizontal viewing axis of the viewing plane such that the preferential viewing cone simultaneously is horizontally expanded and vertically compressed.

21. The ridged reflector according to claim 9 wherein adjacent ones of the ridges have their first faces tilted with respect to one another such that the first face of each of the ridges is cooperatively directed toward a substantially common focal point within the radiation pattern.

* * * * *

UNITED STATES PATENT AND TRADEMARK OFFICE
CERTIFICATE OF CORRECTION

PATENT NO. : 6,285,425 B1
DATED : September 4, 2001
INVENTOR(S) : Akins et al.

It is certified that error appears in the above-identified patent and that said Letters Patent is hereby corrected as shown below:

<u>Title page, Item [54] and Column 1, lines 2-3,</u>
Title, after "DISPLAY", delete "HAVING A CURVED AND A PLANAR FACET FOR EACH RIDGE"

Signed and Sealed this

Eighteenth Day of June, 2002

*Attest:*

*Attesting Officer*

JAMES E. ROGAN
*Director of the United States Patent and Trademark Office*